United States Patent
Canard et al.

(10) Patent No.: US 8,522,027 B2
(45) Date of Patent: Aug. 27, 2013

(54) METHOD FOR AUTHENTICATING AN ENTITY BY A VERIFIER

(75) Inventors: Sébastien Canard, Caen (FR); Iwen Coisel, Wavre (BE); Marc Girault, Caen (FR)

(73) Assignee: France Telecom, Paris (FR)

( * ) Notice: Subject to any disclaimer, the term of this patent is extended or adjusted under 35 U.S.C. 154(b) by 58 days.

(21) Appl. No.: 12/997,109

(22) PCT Filed: Jun. 16, 2009

(86) PCT No.: PCT/FR2009/051143
§ 371 (c)(1),
(2), (4) Date: Dec. 9, 2010

(87) PCT Pub. No.: WO2009/153519
PCT Pub. Date: Dec. 23, 2009

(65) Prior Publication Data
US 2011/0107102 A1  May 5, 2011

(30) Foreign Application Priority Data

Jun. 16, 2008  (FR) ...................................... 08 53956

(51) Int. Cl.
*H04L 9/00* (2006.01)
(52) U.S. Cl.
USPC ........... 713/170; 713/168; 713/169; 713/186; 380/46
(58) Field of Classification Search
USPC ....................................................... 713/170
See application file for complete search history.

(56) References Cited

U.S. PATENT DOCUMENTS

| | | | | |
|---|---|---|---|---|
| 6,842,106 B2 * | 1/2005 | Hughes et al. | ................. | 340/5.8 |
| 7,239,242 B2 * | 7/2007 | Ghosh | ......................... | 340/572.1 |
| 7,312,707 B1 * | 12/2007 | Bishop et al. | .............. | 340/572.1 |
| 7,450,010 B1 * | 11/2008 | Gravelle et al. | ............. | 340/572.1 |
| 8,031,055 B2 * | 10/2011 | Kim et al. | ................... | 340/10.51 |
| 8,154,405 B2 * | 4/2012 | Gravelle et al. | ............. | 340/572.1 |
| 2003/0018893 A1 * | 1/2003 | Hess et al. | ..................... | 713/169 |
| 2004/0066278 A1 * | 4/2004 | Hughes et al. | ................. | 340/10.1 |
| 2005/0156022 A1 * | 7/2005 | Hepworth et al. | ............ | 235/375 |
| 2005/0246338 A1 * | 11/2005 | Bird | ................................ | 707/9 |
| 2006/0022799 A1 * | 2/2006 | Juels | ............................ | 340/10.1 |
| 2006/0050877 A1 * | 3/2006 | Nakamura | ...................... | 380/46 |
| 2009/0225985 A1 * | 9/2009 | Dolev et al. | .................... | 380/270 |

OTHER PUBLICATIONS

Zhaoyu et al.: "True Random Number Generator in RFID Systems against Traceability", 2006.*
Phillipe et al.: "Universal Re-encryption for Mixnets", 2004.*

(Continued)

*Primary Examiner* — Kambiz Zand
*Assistant Examiner* — Yonas Bayou
(74) *Attorney, Agent, or Firm* — Drinker Biddle & Reath LLP

(57) ABSTRACT

A method for authenticating an entity by a verifier, the entity having an identifier, the verifier having a pair of private and public keys, comprising: sending to the entity a first random number selected by the verifier; a step wherein the entity encrypts a value by means of the public key of the verifier, said value including the first random number and an authentication datum on which the identifier of the entity depends; and the entity of said encrypted value sending a reply to authenticate said entity. The invention can be applied to the field of low-cost cryptography, especially the field of radio-identification.

10 Claims, 2 Drawing Sheets

(56) References Cited

OTHER PUBLICATIONS

NPL Zhaoyu et al.: "True Random Number Generator in RFID Systems against Traceability", 2006.*

NPL Phillipe et al.: "Universal Re-encryption for Mixnets", 2004.*

Cui et al., "Lightweight Asymmetric Privacy-Preserving Authentication Protocols Secure against Active Attack," Proceedings of the Fifth Annual IEEE International Conference on Persuasive Computing and Communications Workshops, IEEE Computer Society, pp. 1-6 (Mar. 23, 2007).

Golle et al., "Universal Re-encryption for Mixnets," Topics in Cryptology A CT-RSA 2004, Lecture Notes in Computer Science, LNCS, Springer-Verlag, Berlin, Heidelberg, vol. 2964, pp. 163-178 (Jan. 30, 2004).

Liu et al., "True Random Number Generator in RFID Systems against Traceability," Consumer Communications and Networking Conference, 2006, CCNC 2006, $3^{rd}$ IEEE Las Vegas, NV, USA Jan. 8-10, 2006, Piscataway, NJ, USA, IEEE, vol. 1, pp. 620-624 (Jan. 8, 2006).

* cited by examiner

METHOD FOR AUTHENTICATING AN ENTITY BY A VERIFIER

CROSS-REFERENCE TO RELATED APPLICATIONS

This application is the U.S. national phase of the International Patent Application No. PCT/FR2009/051143 filed Jun. 16, 2009, which claims the benefit of French Application No. 08 53956 filed Jun. 16, 2008, the entire content of which is incorporated herein by reference.

FIELD OF THE INVENTION

The invention relates to a technique for authenticating an entity with a verifier, the entity possessing an identifier, the verifier possessing a private key/public key pair.

The invention finds a particularly beneficial application in the field of low-cost cryptography, notably in the field of radio frequency identification, or "RFID".

BACKGROUND

Radio frequency identification is a technique for storing and recovering remote data by using markers called radio tags (one also speaks of "RFID tags"). A radio tag is a small object, such as a self-adhesive tag, which may be stuck onto, or incorporated into, objects or products. It comprises an antenna associated with an electronic chip which allows it to receive and to respond to radio requests emitted from an emitter-receiver called a reader. Radio tags are used for example to identify persons when the tags are integrated into passports, into transport tickets, or into payment cards, or to identify products such as with a bar code. The reader is then the verifier in charge of the authentication of the tags which are entities to be authenticated.

With a view to protecting privacy, notably the privacy of persons who possess owners of a radio tag, it is generally desirable that the protocol for authenticating tags by a reader possesses three properties:

- the protocol must be anonymous, that is to say it must not be possible for a malicious adversary to identify an entity which is involved in an authentication,
- the entity must not be traceable, that is to say it must not be possible to link two different authentications of one and the same entity, and
- if the malicious adversary obtains the identifier of an entity by any procedure whatsoever, by a so-called "reverse engineering" procedure, by a physical attack on a backing card supporting the tag, etc., it must not be possible to recognize earlier authentications of the entity. The latter property is the so-called "forward privacy" property. It is noted that the anonymity property is an indispensable prerequisite for the fulfillment of the non-traceability and "forward privacy" properties.

When such a protocol is used for the identification of persons, it is understood that these three properties contribute toward maintaining the privacy of such persons.

In order to satisfy these properties, various authentication protocols may be defined, for example, protocols based on a question-answer mechanism and using a random number. Protocols based on secret-key cryptography are thus known.

In an exemplary use of secret-key cryptography, each entity able to authenticate itself with a verifier possesses a unique secret key, known to the verifier. The "WSRE" protocol (from the name of their authors, Weis-Sarma-Rivest-Engel) is thus known, in which, on a verifier authentication request, the entity uses an identifier ID which is specific to it and computes $H(ID\|r)$ by applying a hash function H to the concatenation of its identifier ID and of a random number r chosen by the entity, and then sends the result of this computation as well as the random number r to the verifier. It is noted that the identifier ID of the entity is used as secret key of the entity. In order that this authentication protocol be anonymous, the verifier must then test each entity identifier, accessible for example via a database of the identifiers, and compute the hash of each of the identifiers concatenated with the random number received so as to retrieve the identifier of the entity which has responded to this authentication request. It will be noted that when the number of entities able to authenticate themselves with the verifier is very large, such a search is very expensive in terms of computations.

In a variant embodiment of such a protocol which avoids a replay by an adversary, the verifier sends a first random number to the entity. The entity responds by returning the concatenate of its identifier with the first random number and with a second random number that it generates, as well as the second random number. In this embodiment also, to guarantee anonymity, a search among all the entity identifiers must be performed, this once again being expensive in terms of computations.

There therefore exists a requirement for a protocol for authenticating an entity with a verifier, which is anonymous and which offers good performance in terms of speediness of authentication.

SUMMARY

The invention fulfills this requirement by proposing a method for authenticating an entity with a verifier, the entity possessing an identifier ID, the verifier possessing a private key/public key pair, comprising:

- a sending to the entity of a first random number chosen by the verifier,
- a step of encrypting a value by the entity by means of the public key of the verifier, said value comprising the first random number and an authentication datum on which the identifier of the entity depends, and
- a sending in response, by the entity, of said encrypted value, for authentication of said entity.

In an advantageous manner, the method according to the invention guarantees the anonymity of the entities which authenticate themselves while offering good performance in terms of computation time.

Starting from a first assumption where the entity identifiers are secret, each being known on the one hand to the entity which possesses this identifier, and on the other hand to the verifier which accesses a database containing all the entity identifiers, the protocol according to the invention guarantees the anonymity of the entities since the identifier which is involved in the authentication is encrypted for the attention of the verifier. Thus, a malicious adversary cannot identify an entity which is involved in an authentication. Only the verifier is able to identify the entity which authenticates itself since only the verifier possesses the private decryption key associated with the public key used by the entity to encrypt the value that it sends to the verifier. Anonymity is therefore ensured here by encryption.

The adversary cannot pass itself off as a legitimate entity since the entity identifiers are secret, known on the one hand to the entities, on the other hand to the verifier, via the database of the entity identifiers.

Furthermore, the method according to the invention offers beneficial performance in terms of computation time, compared with prior art protocols, since the verifier identifies the entity which authenticates itself at the very moment of the decryption of the value that it receives from the entity in response to an authentication request. Thus no search needs to be performed in a base of the entity identifiers, this being very advantageous in terms of performance when the number of entities able to authenticate themselves is very large.

The protocol according to the invention combines the use of public-key cryptography from the point of view of the verifier, which places its public encryption key at the disposal of the entities and which possesses only its private decryption key, and the use of secret keys which are the entity identifiers.

The protocol according to the invention possesses the properties required with a view to the protection of privacy. In addition to anonymity, the protocol guarantees:

the property of non-traceability: two authentications performed by the same entity may not be linked together, except by the entity and the verifier that are involved in the authentication. Non-traceability is inherent to the use of the two random numbers during authentication: the first random number r chosen by the verifier and sent in an authentication request, and a second random number w, specific to the encryption scheme used and chosen by the entity so as to encrypt the value that it sends to the verifier in response to the request, the property of forward privacy: if the adversary fraudulently obtains the identifier of an entity, it cannot recognize previous authentications of the entity because the second random number w chosen and used by the entity to encrypt the value returned in response to the verifier authentication request is different at each authentication.

Furthermore, with the protocol according to the invention, so-called replay attacks are not possible. In the course of such attacks, the adversary observes initially the exchanges between the verifier and the entity, and then subsequently replays a response returned by an entity to the verifier during a previous authentication, for a current authentication. With the protocol according to the invention such a replay is not possible. Indeed, each authentication and each response of the entity depends on the first random number transmitted from the verifier to the entity, two responses returned by an entity which authenticates itself during two different authentications are therefore different.

Finally, while the use of public-key cryptography offers a solution to the problem of the anonymity of the entities, by means of an encryption for the attention of the verifier rather than by an exhaustive search among a very large number of identifiers, the choice of suitably adapted algorithms in the method according to the invention ensures effectiveness in terms of computation time. Indeed, it is possible to use authentication algorithms based on public-key encryption, for example "RSA" (from the name of the inventors Rivest, Shamir and Adelman). However, such public-key algorithms are often very expensive for the entity which authenticates itself since they make it necessary to do significant mathematical computations, such as multiplications, or indeed modular exponentiations. The method according to the invention uses algorithms adapted for minimizing the computations to be performed by an entity which authenticates itself. Indeed, the algorithms make it possible to pre-compute data necessary for the encryption operation. Thus, the inherent cost of the encryption operations is lower for the entities which authenticate themselves.

In an embodiment of the method according to the invention, the authentication datum is an antecedent $a_{id}$ of the identifier, a one-way function f applied to this antecedent producing the identifier ID of the entity.

In this embodiment, the verifier obtains the identifier of an entity that it authenticates by computation, by applying the one-way function f to the authentication datum received from the entity. The authentication datum is the antecedent $a_{id}$ of the identifier ID of the entity under the one-way function f. In an advantageous manner, in this variant embodiment of the invention, it is not necessary for the identifier of the entity to be secret. The secret, known only to the entity, is in this variant the antecedent $a_{id}$. It is noted that the antecedent $a_{id}$ may not be computed by an adversary, even if the latter knows the identifier ID of the tag since by definition the one-way function f is difficult to invert, that is to say it is extremely difficult to deduce the input datum, here $a_{id}$, from the output datum alone, here $f(a_{id})$, or the identifier ID of the entity.

In an embodiment of the method according to the invention, the encryption step uses at least one result of a pre-computation, stored in the entity.

The method according to the invention exploits the possibility of pre-computing elements involved in the encryption operation performed by the entity. Thus, mathematical computations which are expensive for the entity, such as for example modular exponentiations, are performed prior to one or more authentications. During an authentication, the entity now performs, as operations, only what is necessary. When the entity has little computational power, it is understood that the gain, in terms of performance, is non-negligible.

In one embodiment of the invention, the encryption complies with an El Gamal public-key encryption scheme, and the step of encrypting the value v produces two elements $T_1 = v \cdot y^w$ and $T_2 = g^w$, where:

g is a generator of a group used by said scheme, y is the public key with which the private key x of the verifier is associated, said keys being such that $y = g^x$, w is a second random number chosen by the entity, the step of decryption by the verifier of the two elements $T_1$ and $T_2$ computes $T_1 \cdot T_2^{-x}$ so as to provide said value v.

Advantageously, the El Gamal encryption scheme is adapted for allowing a pre-computation of a predefined number of data which are used by the entity during the encryption operation. For a current authentication, these pre-computed data used to encrypt the value to be returned to the verifier are called an authentication coupon. A coupon comprises two parts, a first part $y^w$, computed by means of the public key of the verifier and of the second random number w chosen by the entity, and a second part $g^w$ computed by means of the generator of the group in which the computations of the encryption scheme and of the second random number w chosen by the entity are performed. Thus, on the basis of a predefined number of random numbers, a predefined number of authentication coupons are computed. These coupons are stored by the entity which uses them in the course of successive authentications. Thus, during an authentication of the entity with the verifier, the entity uses two of these pre-computed data to encrypt the value that it sends in response to the authentication request received from the verifier. By using these pre-computed data, the tag now merely needs, upon an authentication requested by the verifier, to multiply the first random number received from the verifier and concatenated with its identifier ID, by the pre-computed element $y^w$. The computation times are therefore optimized for the tag with respect to a computation time customarily required by the tag to encrypt the value to be sent to the verifier without using pre-computed data. The optimization of the computation time for the tag, coupled with the performance inherent to the authentication method from the point of view of the verifier (the verifier obtains the identifier ID of the tag directly during decryption of the value that it receives encrypted), makes it possible to class the authentication method according to the invention as ultra-fast.

The tag can perform the pre-computation itself. In an alternative embodiment of the invention, the coupons may be computed by an external application and written to a memory of the tag. Such a write can be done regularly so as to reload the memory of the tag with coupons with a view to responding to future authentication requests of the verifier.

In a variant embodiment of the method according to the invention, the encryption complies with a public-key encryption scheme, called the modified El Gamal scheme, and
the step of encrypting the value (v) produces two elements $T'_1 = v \oplus H(y^w)$, and $T'_2 = g^w$, where
H is an identity function, and $\oplus$ an exclusive or operation,
g is a generator of a group used by said scheme,
y is the public key with which the private key x of the verifier is associated, said keys being such that $y = g^x$,
w is a second random number chosen by the entity,
the step of decryption by the verifier of the two elements $T_1$ and $T_2$ computes $T'_1 \oplus H(T'^x_2)$ so as to provide said value v.

In this scheme, called the modified El Gamal scheme, when pre-computed data are used, the tag now merely needs, upon an authentication requested by the verifier, to do an exclusive or between the first random number received from the verifier and concatenated with its identifier ID, and $H(y^w)$, where the element $y^w$ is pre-computed.

In a variant embodiment of the modified El Gamal encryption scheme, the step of encrypting the value (v) produces two elements $T'_1 = v \oplus H'(y^w)$, and $T'_2 = g^w$, where
H' is a hash function, and $\oplus$ an exclusive or operation,
g is a generator of a group used by said scheme,
y is the public key with which the private key x of the verifier is associated, said keys being such that $y = g^x$,
w is a second random number chosen by the entity,
the step of decryption by the verifier of the two elements $T_1$ and $T_2$ computes $T'_1 \oplus H'(T'^x_2)$ so as to provide said value v.

In an advantageous manner, the modified El Gamal encryption scheme offers very beneficial performance in respect of the tag which, in order to respond to an authentication request of the verifier, needs do only a few computations, and simple computations at that. Coupled with a pre-computation and a storage by the tag of coupons in order to respond to an authentication request of the verifier, it is understood that the authentication method gains in terms of effectiveness from the point of view of the tag.

A hash function is a one-way function which produces hashes of fairly short size. Thus, the storage of the hash function H, for example SHA-256, applied to $y^w$ requires 160 bits in order to be safe. The storage of $y^w$, as well as $g^w$, can require 160 bits if elliptic curves are used as field for the encryption scheme. Advantageously the method according to the invention is very well adapted for authentications of entities of RFID tag type which have a limited memory capacity.

In the embodiments of the invention where the modified El Gamal scheme is used, the method furthermore comprises a sending by the entity of an authentication message computed by means of a secret key and of a message to be protected, said secret key depending on the identifier of the tag, said message to be protected comprising at least one part of the first random number.

In an advantageous manner, the sending of an authentication message, for example of "MAC" (for "Message Authentication Code") type, makes it possible to avoid substitution attacks when the modified El Gamal encryption scheme is used. Indeed, by using such a scheme, it is possible for an adversary to pass himself off as the entity without knowing the identifier ID of the entity. Returning the MAC authentication message to the verifier makes it possible to prove to the verifier that the entity knows the identifier ID.

In one embodiment of the invention, the method comprises beforehand:
a pre-computation of a predefined number of authentication coupons, an authentication coupon comprising two parts $y^w$, $g^w$, said two parts depending on the second random number w chosen by the entity and being necessary in order to compute the two elements $T_1$, $T_2$ corresponding to the encryption of the value,
a storage of said predefined number of coupons by the entity, a coupon being used by the entity to respond to an authentication request originating from the verifier.

The invention also relates to an entity adapted for being authenticated by a verifier, the entity possessing an identifier, the verifier possessing a private key/public key pair, and comprising:
reception means, designed to receive from the verifier a first random number chosen by the verifier,
encryption means, designed to encrypt a value v by means of the public key of the verifier, said value comprising the first random number and an authentication datum on which the identifier of the tag depends,
sending means, designed to send said encrypted value v to the verifier.

In one embodiment of the invention the entity furthermore comprises means of storage of at least one result of a pre-computation, said result being intended to be used by the encryption means.

The invention also relates to a verifier adapted for authenticating at least one entity, the entity possessing an identifier, the verifier possessing a private key/public key pair, the verifier comprising:
sending means, designed to send a first random number r to the entity,
reception means, designed to receive from the entity a value v encrypted by means of the public key of the verifier, said value comprising the first random number r and an authentication datum on which the identifier of the tag depends,
decryption means, designed to decrypt by means of the private key of the verifier the encrypted value received from the entity.

The invention also pertains to a computer program intended to be installed in a memory of a verifier, comprising instructions for the implementation of the steps of the method for authenticating an entity according to the invention, which are executed by the verifier when the program is executed by a processor.

The invention also relates to a data medium on which is recorded the computer program intended to be installed in a memory of a verifier according to the invention.

The invention also relates to a computer program intended to be installed in a memory of an entity, comprising instructions for the implementation of the steps of the method for authenticating an entity according to the invention, which are executed by the entity when the program is executed by a processor.

The invention also relates to a data medium on which is recorded the computer program intended to be installed in a memory of an entity according to the invention.

BRIEF DESCRIPTION OF THE DRAWINGS

Numerous details and advantages of the invention will be better understood on reading the description of a particular embodiment with reference to the appended diagrams given by way of nonlimiting illustration, and in which.

DETAILED DESCRIPTION

Figure 1:
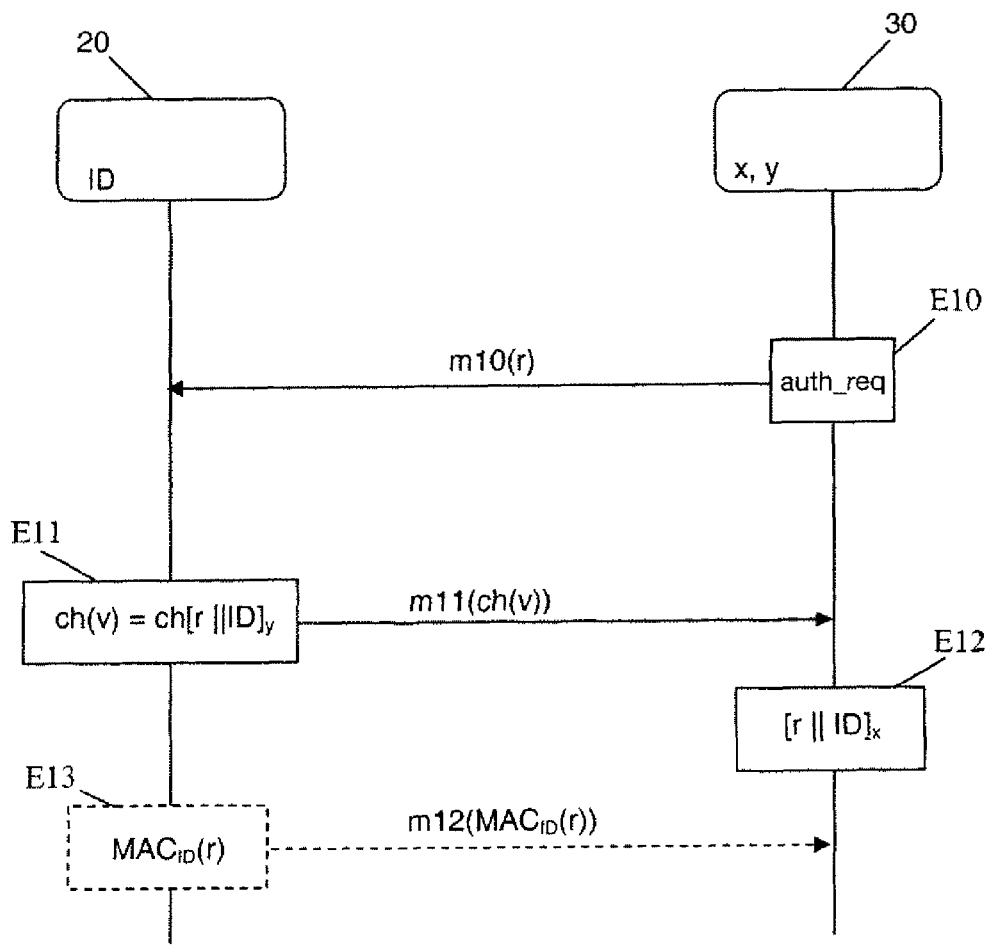
FIG. 1 represents the steps of the method for authenticating an entity by a verifier according to a particular embodiment of the invention.

The steps of a method for authenticating a radio tag by a radio reader will now be described in conjunction with FIG. 1.

Although the method according to the invention is described here in the case of authentication of a radio tag by a radio reader, the method according to the invention is not limited to this particular example. Thus, the invention may be applied to the authentication of any entity by a verifier.

A radio reader 30 is designed to authenticate a set of radio tags referenced in a tag identifier database, not represented, to which the reader 30 has access. A radio tag 20, endowed with a unique identifier ID, is referenced in the identifier database to which the reader 30 has access. The radio reader 30 possesses a pair of keys which is specific to it comprising a private key x, and an associated public key y. The pair of keys is generated in accordance with a public-key encryption scheme. Two examples of encryption schemes are detailed further on. They are based on a known scheme, the El Gamal scheme.

In an initial step E10, the reader 30 issues an authentication request m10. The message m10 comprises a first random number r, chosen by the reader 30.

After reception of the authentication request m10, in a step E11 of encryption and sending of a response, the tag 20 computes a ciphertext of a value v by means of the public key y of the reader 30. The value v comprises the first random number r and an authentication datum on which the identifier ID of the tag 20 depends. In an exemplary embodiment of the invention, the authentication datum is the identifier ID of the tag, and the value is obtained by concatenating the first random number r with the identifier ID of the tag. At the end of step E11, the tag 20 sends to the reader 30 the value v encrypted in a message m11.

In a decryption step E12, subsequent to the reception of the message m11, the reader 30 uses its private key x to decrypt the value v received encrypted in the message m11. The decryption of the value v makes it possible to obtain the concatenation of the random number r with the identifier ID of the tag and thus the identifier ID of the tag. The verifier verifies that the random number r obtained by decrypting the value v is indeed equal to the first random number r sent in the authentication request m10. The aim of this verification is to avoid a possible replay attack. In the course of such an attack, an adversary who has observed previous sends of a response by the entity replays these responses so as to pass himself off as the entity. Because each entity response depends on the first random number sent by the verifier in the authentication request, and as the first random number is different at each authentication, such a response replay is therefore impossible. Decryption of the value v also provides the identifier of the tag. Thus, the tag 20 is identified and authenticates itself at the same time since it gives, and proves that it knows, its identifier. Indeed, it alone is able to do so since it alone together with the reader knows its identifier ID. The method according to the invention uses a shared secret key which is the identifier of the tag 20.

In a verification step, not represented, the reader 30 verifies that the tag identifier obtained by decrypting the encrypted value v received does indeed correspond to the identifier of a valid tag. A test for the presence or the absence of the identifier in the database of the valid tag identifiers makes it possible to perform this verification.

In an alternative embodiment of the invention, in step E11 of encryption and sending of a response, the authentication datum does not explicitly contain the identifier but a secret key $a_{id}$ which is an antecedent of the identifier ID under a one-way function f. The function f is for example an "RSA" function (from the name of the inventors, "River, Shamir and Adelman"), or a hash function such as for example "SHA-256" ("Secure Hash Algorithm"). Thus, the authentication datum is the antecedent $a_{id}$ of the identifier ID, and the identifier ID may be obtained by applying the function f to the antecedent $a_{id}$ ($f(a_{id})$=ID). Advantageously, the tag does not have to store its identifier but only the antecedent $a_{id}$ of the identifier. Furthermore, it is not indispensable that the tag identifiers are kept secret since the use of a one-way function guarantees that an adversary who knew the identifier ID of a tag would not be able to deduce therefrom the authentication datum $a_{id}$ required for authentication.

The authentication protocol according to the invention uses a public-key encryption scheme offering beneficial computational performance notably from the point of view of the tag, which is limited in terms of computational capacity and memory capacity. Furthermore, the scheme used by the method according to the invention is adapted for allowing a pre-computation of certain data intended to be used during the encryption step which is performed by the tag. Thus, it is possible to pre-compute a predefined number of such data, called coupons, so that the tag authenticates itself the predefined number of times at the reader while performing the fewest possible computations. For example, ten or twenty coupons are pre-computed. The pre-computations are performed by the tag and then stored in a memory of the tag, or by an external entity, not represented, the coupons pre-computed by the external entity then being installed in the memory of the tag regularly.

In an exemplary embodiment of the invention, the public-key encryption scheme is an El Gamal scheme. With this scheme, the computations are performed in, for example, the multiplicative group of a finite field or the group formed by an elliptic curve. Whatever this group, the law is written hereinbelow multiplicatively. In this scheme, termed the base scheme, let g be an element of the group, the reader 30 possesses a private key, denoted x, and an associated public key, denoted y, y being obtained according to the following computation: $y=g^x$.

By taking the value v as input and a second random number w chosen by the tag, then the encryption of the value v corresponds to two elements $T_1$ and $T_2$, obtained by the following computations:

$$T_1 = v \cdot y^w, \text{ and}$$

$$T_2 = g^w$$

The decryption by the reader of $T_1$ and $T_2$ consists in retrieving $T_1 \cdot T_2^{-x}$ so as to retrieve the value v provided as input to the encryption.

In a second exemplary embodiment of the invention, the encryption scheme corresponds to an El Gamal scheme modified as follows:

The reader 30 possesses a private key denoted x and an associated public key denoted y, y being obtained in a known manner according to the following computation: $y=g^x$.

By taking the value v as input and a second random number w chosen by the tag, then the encryption of the value v corresponds to the two elements $T_1$ and $T_2$, obtained by the following computations:

$T_1 = v \oplus H(y^w)$, where $\oplus$ represents an exclusive or operation, and H represents a function, for example the identity function, or a hash function, and $$T_2 = g^w$$

The decryption by the reader of $T_1$ and $T_2$ then consists in computing $T_1 \oplus H(T_2^x)$, to retrieve the value v provided as input to the encryption.

In a known manner, a hash function, for example SHA-256, is a one-way function which produces hashes of fairly short size. Thus, the storage of a result obtained by applying the hash function H to $y^w$ requires 160 bits in order to be safe. The storage of $y^w$, as well as $g^w$, can require 160 bits if elliptic curves are used as field for the encryption scheme. Thus, in one embodiment of the invention where authentication coupons are pre-computed and stored in the entity, the use of the hash function is beneficial in terms of memory space required to store the pre-computed coupons. This mode is notably beneficial in the case where the entity is an RFID tag with a limited memory capacity.

In the alternative embodiment of the invention, where the modified El Gamal encryption scheme is used, then the entity also computes, and then sends in a step E13 represented dashed in FIG. 1, an authentication message m12 usually called "MAC" (for "Message Authentication Code"). The aim of sending such an authentication message is to mitigate a possible attack of an adversary who might substitute himself for the tag in authentication exchanges with the reader 30. The aim of sending the authentication message m12 is to provide proof that the tag 20 knows the identifier ID used to compute the response to the authentication request returned to the reader in step E11.

In the course of such an attack, an adversary who observes exchanges of messages between the reader 30 and the tag 20, would for example see the first random number r travel from the reader 30 to the tag 20, and then the elements $T_1$ and $T_2$ sent in response by the tag 20. In the course of a later authentication, in the course of which the reader 30 would send a new random number r', then the adversary could respond to the reader by sending new elements $T'_1$ and $T'_2$, with $T'_2=T_2$ and $T'_1=T_1 \oplus (r \oplus r' \| 0 \ldots 0)$. By expanding, we obtain $T'_1 = (r' \| ID) y^w$, which conforms to what the reader 30 expects. Thus, the adversary can respond to an authentication request of the reader 30 without knowing the identifier ID of the tag 20 for which he substitutes himself. However, the adversary may not produce an authentication message computed on the basis of the identifier ID of the tag 20 that he does not know.

The MAC authentication message sent by the tag 20 in the message m12 is computed in a conventional manner by means of a secret key and of a message to be protected. The secret key used to compute the authentication message depends on the identifier ID. For example, in one embodiment of the invention, the secret key is the identifier ID of the tag 20. In another embodiment of the invention, the secret key may be computed on the basis of the element $y^w$. The message to be protected by the authentication message depends on the first random number r received from the verifier. For example, the message to be protected comprises the first random number r, or a truncation of the random number r. In the exemplary embodiment of the invention, where the function H used in the modified El Gamal scheme to compute the element $T_1$ during encryption is a hash function, then the latter may be used to compute the authentication message.

In an exemplary embodiment of the invention, the MAC authentication message is sent in the message m11. Thus, in step E11 of encryption and sending of a response, the tag 20 computes the encrypt of a value v by means of the public key y of the reader 30. The value v, in this exemplary embodiment, comprises the first random number r, the authentication datum on which the identifier ID of the tag 20 depends, as well as the MAC authentication message. In an exemplary embodiment of the invention, the authentication datum is the identifier ID of the tag, and the value v is obtained by concatenating the first random number r with the identifier ID of the tag and with the MAC authentication message ($v = r \| ID \| MAC$). At the end of step E11, the tag 20 sends the value v encrypted in the message m11 to the reader 30. In this example, fewer data are sent since a single message is transmitted to the reader 30 instead of two. Furthermore, this exemplary embodiment makes it possible to resist a certain type of attack. In the course of such an attack, an attacker who recovers the identifier of the tag 20, for example by a physical attack of the card, is capable of tracing previous authentications of the tag 20. By taking the MAC authentication message into account in the encrypted message, this kind of attack is avoided. Thus, the property of forward privacy is complied with.

Figure 2:
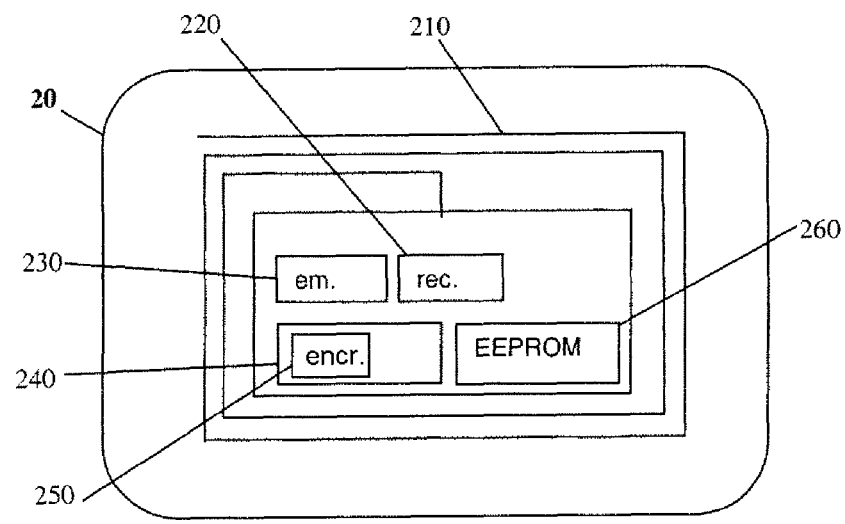
FIG. 2 represents a first exemplary embodiment of an entity according to the invention.

An entity according to the invention will now be described in conjunction with FIG. 2. The exemplary entity described here is a radio tag 20, adapted for dialoguing with a reader (not represented in FIG. 2) in the course of an authentication sequence in accordance with the previously described steps of the method according to the invention.

In the particular example described here, the tag 20 is a passive device receiving its energy from the reader during an interrogation by the latter. The tag 20 possesses a unique identifier ID and comprises in general:

an antenna 210 adapted for receiving and emitting by radio, a reception module 220, adapted for receiving data from the reader. The reception module 220 cooperates with the antenna 210 to constitute reception means. The reception means 220, 210 are adapted for receiving from the reader an authentication request comprising a first random number r chosen by the reader, an emission module 230, adapted for emitting toward the reader. The emission module 230 cooperates with the antenna 210 to constitute emission means. The emission means 230, 210 are adapted for sending to the reader in response a value encrypted by encryption means 250, a silicon chip 240 comprising a plurality of transistors adapted for constituting logic gates of non-programmable hard-wired logic. The hard-wired logic defines:

the encryption means 250, designed to encrypt the value v by means of the public key of the reader. The value v is a response to the authentication request received from the reader. The value v is a concatenation of the first random number r received from the reader and of an authentication datum on which the identifier ID of the tag depends, storage means 260, such as a memory of "EEPROM" type (for "Electrically Erasable Programmable Read Only Memory"), to store the public key of the reader.

In a variant embodiment of the invention where a predefined number of authentication coupons are pre-computed, the storage means 240 are also designed to store the predefined number of authentication coupons.

In a particular embodiment of the invention which is not detailed, the tag 20 has a structure comparable with that of a chip card and comprises a cryptographic micro-processor, a data memory and a program memory.

In another embodiment of the invention, not detailed, the tag 20 is an active device. The tag 20 is then equipped with a battery allowing it to emit signals. Thus, the tag 20 and the reader 30 can interact over a more significant distance than in the case where the tag 20 is a passive device which receives its energy from the reader.

In a particular embodiment of the invention, the entity is a computerized system, such as a personal computer which authenticates itself with a verifier, for example a server. In this embodiment, the entity comprises conventional means of a computer and the invention in this case also relates to:
- a computer program comprising instructions for the implementation of the steps of the authentication method that are carried out by the entity such as previously described, when this program is executed by a processor;
- a recording medium readable by an entity on which the computer program described hereinabove is recorded.

The software modules may be stored in, or transmitted by, a data medium. The latter may be a hardware storage medium, for example a CD-ROM, a magnetic diskette or a hard disk, or else a transmission medium such as a signal, or a telecommunication network.

Figure 3:
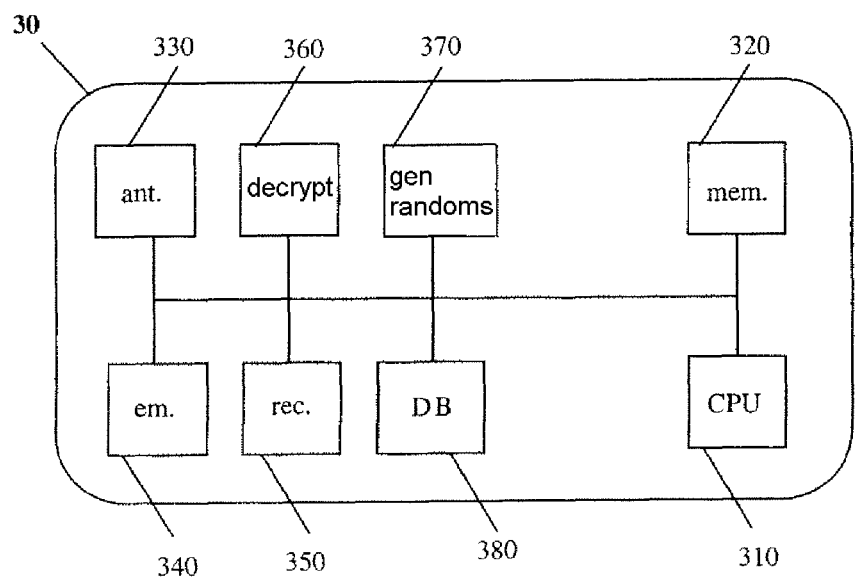
FIG. 3 represents a first exemplary embodiment of a verifier designed to authenticate an entity represented in FIG. 2.

A verifier according to the invention will now be described in conjunction with FIG. 3. In the particular example described here, the verifier is a radio reader 30 adapted for authenticating radio tags such as are described in conjunction with FIG. 2.

The radio reader 30 is an active device emitting radio frequencies which activates a tag (not represented in FIG. 3) which passes in proximity thereto by providing it with energy which it requires. The reader 30 according to the invention is adapted for dialoguing with the tag in the course of an authentication sequence in accordance with the previously described steps of the method according to the invention.

The reader 30 comprises several modules:
- a processing unit 310, or "CPU" (standing for "Control Processing Unit"),
- a set of memories 320, including a volatile memory, or "RAM" (for "Random Access Memory") used to execute code instructions, store variables, etc., and a read only memory, "ROM", used for example to store the secret key of the reader,
- an antenna 330, adapted for emitting and receiving by radio,
- an emission module 340, designed to emit toward the tag. The emission module 340 uses the antenna 330 to emit, and coupled with the antenna 330 it constitutes emission means of the reader 30. In particular, the emission means are designed to send to the tag an authentication request to the tag comprising a first random number r,
- a reception module 350, designed to receive from the tag a value v encrypted by means of the public key of the reader. The value v is a concatenation of the first random number r received from the reader and of an authentication datum on which the identifier ID of the tag depends. In one embodiment of the invention the authentication datum is the identifier ID of the tag. In a second embodiment of the invention, the datum is an antecedent $a_{ID}$ of the identifier under a one-way function f. The reception module 350 uses the antenna 330 to receive, and coupled with the antenna 330 it constitutes reception means of the reader 30,
- a decryption module 360, designed to decrypt by means of the private key of the reader the encrypted value v received from the entity,
- a generator of random numbers 370, designed to generate random numbers to be sent to the tag in an authentication request,
- a module 380 for accessing a tag identifier database, not represented, external to the reader.

The various modules communicate via a communication bus.

The modules 340, 350, 360 and 370 are designed to implement the steps of the method for authenticating an entity such as a tag by a verifier, such as the previously described reader. These are preferably software modules comprising software instructions for executing the steps of the authentication method which is described in conjunction with FIG. 1.

The invention therefore also relates to:
- a computer program comprising instructions for the implementation of the authentication method such as previously described, when this program is executed by a processor;
- a recording medium readable by a verifier on which the computer program described hereinabove is recorded.

The software modules may be stored in, or transmitted by, a data medium. The latter may be a hardware storage medium, for example a CD-ROM, a magnetic diskette or a hard disk, or else a transmission medium such as a signal, or a telecommunication network.

The invention also relates to an authentication system comprising a verifier in accordance with the description given previously and at least one entity, in accordance with the description given previously.

The invention claimed is:

1. A method for authenticating an entity with a verifier, the entity possessing an identifier, the verifier possessing a private key/public key pair, the method comprising the steps:
   sending to the entity a first random number chosen by the verifier,
   encrypting a value (v) by the entity by means of the public key of the verifier, said value comprising the first random number and an authentication datum on which the identifier of the entity depends, in which the encryption complies with a public-key encryption scheme, called the modified El Gamal scheme, wherein:
   the step of encrypting the value (v) produces two elements $T'_1 = v \oplus H(y^w)$, and $T'_2 = g^w$, where:
   H is an identity function or a hash function, and $\oplus$ an exclusive or operation,
   g is a generator of a group used by said scheme,
   y is the public key with which the private key x of the verifier is associated, said keys being such that $y = g^x$,
   w is a second random number chosen by the entity,
   the step of decryption by the verifier of the two elements $T_1$ and $T_2$ computes $T_1' \oplus H(T_2'^x)$ so as to provide said value (v), and
   sending in response, by the entity, of a message comprising said encrypted value, for authentication of said entity.

2. The method as claimed in claim 1, wherein the authentication datum is an antecedent of the identifier, a one-way function applied to this antecedent producing the identifier of the entity.

3. The method as claimed in claim 1, wherein the encryption step uses at least one result of a pre-computation, stored in the entity.

4. The method as claimed in claim 1, comprising sending by the entity of an authentication message computed by means of a secret key and of a message to be protected, said secret key depending on the identifier of the entity, said message to be protected comprising at least one part of the first random number.

5. The method as claimed in claim 4, wherein the authentication datum included in the encrypted value (v) for the verifier comprises the identifier and the authentication message.

6. The method as claimed in claim 1, comprising the following steps performed beforehand:
   pre-computation of a predefined number of authentication coupons, an authentication coupon comprising two parts, said two parts depending on the second random number chosen by the entity and being necessary in order to compute the two elements corresponding to the encryption of the value,
   storage of said predefined number of coupons by the entity, a coupon being used by the entity to respond to an authentication request originating from the verifier.

7. An entity adapted for being authenticated by a verifier, the entity possessing an identifier, the verifier possessing a private key/public key pair, and comprising:
   a receiver configured to receive from the verifier a first random number chosen by the verifier,
   an encryption element configured to encrypt a value (v) by means of the public key of the verifier, said value comprising the first random number and an authentication datum on which the identifier of the tag depends, in which the encryption complies with a public-key encryption scheme, called the modified El Gamal scheme, wherein: . . .
   a sender configured to send said encrypted value (v) to the verifier.

8. The entity as claimed in claim 7, further comprising a storing element of at least one result of a pre-computation for use by the encryption means.

9. A verifier adapted for authenticating at least one entity, the entity possessing an identifier, the verifier possessing a private key/public key pair, the verifier comprising:
   a sender configured to send a first random number to the entity,
   a receiver configured to receive from the entity a value (v) encrypted by means of the public key of the verifier, said value comprising the first random number and an authentication datum on which the identifier of the tag depends, in which the encryption complies with a public-key encryption scheme, called the modified El Gamal scheme, wherein: . . .
   a decryption element configured to decrypt by means of the private key of the verifier the encrypted value received from the entity.

10. A non-transitory computer program product for installation in a memory of a verifier, comprising instructions which when executed by the verifier cause the verifier to perform the steps of:
    sending to the entity a first random number chosen by the verifier,
    encrypting a value (v) by the entity by means of the public key of the verifier, said value comprising the first random number and an authentication datum on which the identifier of the entity depends, in which the encryption complies with a public-key encryption scheme, called the modified El Gamal scheme, wherein:
    the step of encrypting the value (v) produces two elements $T'_1.v.sym.H(y^w)$, and $T'_2.g^w$, where:
    H is an identity function or a hash function, and .sym. an exclusive or operation,
    g is a generator of a group used by said scheme,
    y is the public key with which the private key x of the verifier is associated, said keys being such that $y=g^X$,
    w is a second random number chosen by the entity,
    the step of decryption by the verifier of the two elements $T_1$ and $T_2$ computes $T'_1.sym.H'(T'_2{}^x)$ so as to provide said value (v), and
    sending in response, by the entity, of a message comprising said encrypted value, for authentication of said entity.

* * * * *